United States Patent

[11] 3,573,610

| [72] | Inventor | Donald J. Kesselring<br>Phoenix, Ariz. |
|---|---|---|
| [21] | Appl. No. | 796,349 |
| [22] | Filed | Feb. 4, 1969 |
| [45] | Patented | Apr. 6, 1971 |
| [73] | Assignee | Sperry Rand Corporation |

[54] EARTH'S FIELD-SENSITIVE MAGNETOMETER FOR USE IN COMPASS SYSTEMS HAVING GRADUALLY CONVERGING FLUX COLLECTORS AND BEING INSENSITIVE TO VARYING AMBIENT TEMPERATURE
7 Claims, 6 Drawing Figs.

[52] U.S. Cl. ................................................... 324/43, 33/204
[51] Int. Cl. ....................................................... G01r 33/02
[50] Field of Search ........................................... 324/43, 47; 340/197; 33/204.43

[56] References Cited
UNITED STATES PATENTS

| 2,383,460 | 8/1945 | Purves et al. ................. | 324/43 |
| 2,383,461 | 8/1945 | Esval et al. .................... | 324/43 |
| 2,403,347 | 7/1946 | Depp et al. .................... | 340/197 |
| 2,852,859 | 9/1958 | Depp ............................. | 324/43 |

Primary Examiner—Rudolph V. Rolinec
Assistant Examiner—R. J. Corcoran
Attorney—Reginald V. Craddock ABSTRACT: A magnetometer for sensing the horizontal component of the Earth's magnetic field in which the upper and lower radial leg inductors or core members of permeable magnetic material and the upper and lower arcuate collectors of permeable magnetic material associated with the outer peripheral ends of the legs are of substantially equal and uniform cross-sectional areas, the upper and lower collectors being arranged to contact the underside and upper side respectively of the leg inductors and to gradually and uniformly converge toward each other, contacting each other at their free ends; and the base member for supporting the sensitive element, which comprises the permeable core members and associated coils, and to which the sensitive element is securely and firmly fastened in precise position is constructed of a nonmagnetic, electrically insulating material, while the securing devices for holding the sensitive element and base together and for securing the collectors in predetermined position, the core members, and the base, are all formed of such materials that, while having the requisite physical and electrical properties, have temperature coefficients of expansion that closely approximate each other to thereby maintain the sensitive element in its initial precisely positioned condition under varying ambient temperature conditions, the resultant magnetometer arrangement being characterized in that extremely small errors occur in the magnetometer output such that the output of a compass system embodying the same will contain a maximum error of the order of about 12 minutes of arc as compared to prior art devices wherein errors of 38 minutes of arc and greater are ordinarily encountered under similar conditions.

Patented April 6, 1971

INVENTOR
DONALD J. KESSELRING
BY
ATTORNEY

INVENTOR
DONALD J. KESSELRING
BY
*R. V. Craddock*
ATTORNEY

3,573,610

EARTH'S FIELD-SENSITIVE MAGNETOMETER FOR USE IN COMPASS SYSTEMS HAVING GRADUALLY CONVERGING FLUX COLLECTORS AND BEING INSENSITIVE TO VARYING AMBIENT TEMPERATURE

BACKGROUND OF THE INVENTION

Magnetometers or flux valves such as those employed in compass systems and to which the present invention relates are ordinarily formed with three relatively angularly arranged core legs such, for example, as three relatively radially extending core legs arranged at angles of 120° with respect to each other. The sensitive magnetometer element is normally pendulously supported in the earth's field so that the three legs extend outwardly in horizontal fashion so as to sense the horizontal component of the earth's field for azimuthal determinations. The core structure is formed of high magnetic permeability material. An exciting winding is energized with suitable alternating current at fundamental frequency producing an alternating flux in the core members of the sensitive element which serves to pulse the earth's field threading the core legs, and pickup windings which are associated respectively with the core legs will produce a double frequency signal output in response to the earth's field flux, which signal output represents fairly closely a cosine function of the angle between a particular leg and the direction of the earth's field. The pickup windings are connected together in polycircuit or polyphase fashion to supply an output similar to that derived from a three-phase selsyn transmitter.

The legs of the sensitive element are provided with arcuate collectors which extend laterally from the outer peripheral ends of the legs. These are also made of high permeability magnetic material and serve to increase the density of the earth's field flux in the leg inductors. These collectors form part of the overall magnetic circuit. In the past the upper and lower collectors for each leg have been designed to lie in flat parallel relationship and have been connected together at their free ends by means of shorting bars, clamps, and the like, which extend vertically therebetween. As a result, in such constructions, residual or permanent magnetization effects occur at the ends of the collectors. This produces errors in the signal outputs which errors vary in magnitude depending upon the orientation of the sensitive element in the earth's field.

A similar single cycle error occurs in prior flux valves which will vary in magnitude and direction with changes in ambient temperature conditions. The sensitive element is supported upon a base member which normally is pendulously supported to hold the sensitive element normally horizontally, i.e. responsive to the horizontal component of the earth's field. In practice it has been customary precisely to position and secure the sensitive element firmly against the receiving surface of the base and in contact therewith at all material bearing points so that the base and sensitive element will withstand e.g. vibrations, shocks and the like, with minimum resultant change in position therebetween under normal operating conditions. However, under wide ranges of ambient temperatures, the inductors of the sensitive element are not maintained in predesigned position relative to the base member which constitutes the horizontal reference. Relative movement occurs between base and sensitive element and this produces errors in the magnetometer output which vary with the orientation of the magnetometer in the earth's field and with ambient temperature condition. The errors due to both causes above pointed out are of a single cycle nature and produce a resultant error varying with orientation of the magnetometer and changing with changes in conditions under which the device is being used.

SUMMARY OF THE INVENTION

The primary object of this invention resides in so constructing a magnetometer or flux valve, intended to sense the horizontal component of the earth's magnetic field, through proper choice of materials and through the physical arrangement of the core portions thereof that the output signals will contain minimum magnitudes of error components and hence its definition curve, represented at a directional vector rotated throughout 360° in azimuth, will more closely approximate a circle than has heretofore been accomplished. Comparative tests indicate that the accuracy obtained with magnetometers of the present invention represent improvements of the order of reductions in maximum errors from ±38 min. of arc down to and less than ±12 min. of arc for errors due to permanent magnetization effects. Moreover, with the present invention, comparative tests indicate that much greater temperature stability results such that within temperature ranges of from −100° F. to +350° F., the error components due to ambient temperature conditions will not exceed maximum values of the order of about ±12 min. of arc.

More particularly, the above object of my invention is accomplished by arranging the collectors or horns of the magnetometer as close together as possible but relatively spaced and in contact with the leg inductors, respectively, and positioning the upper and lower collector of each pair to gradually and uniformly converge toward each other and into contact adjacent the free ends. At the same time, the individual cross-sectional areas of the collectors and the upper and lower core legs are made substantially equal. This arrangement serves to prevent residual or permanent magnetization occurring at the collector ends or, in other words, it tends to insure the passage of the exciting flux throughout the core structure with substantially the same degree of saturation occurring in all parts thereof.

Additionally, the above object is attained and maintained over wide temperature ranges through an improved correlation of cored material and the material of which the fastening or securing devices for securing the core and coil structure to the base member are composed. More specifically, the sensitive element comprising the core and coil structures must be securely fastened to the base member to be supported thereby with the legs and collectors extending in normally horizontal planes. It must withstand extreme vibrations, temperature changes over wide ranges, shock impacts and still remain to the extent initially adjusted to respond to the earth's horizontal field component. To achieve a construction of the desired character, the materials are chosen having required physical, electrical insulating and magnetic properties and additionally suitably correlated as to the temperature coefficients of expansion of each material such that, while capable of withstanding prescribed operating conditions, the sensitive element will remain in position relative to the base unchanged due to variations in ambient temperatures over wide ranges.

DESCRIPTION OF THE PREFERRED EMBODIMENT

Figure 1:
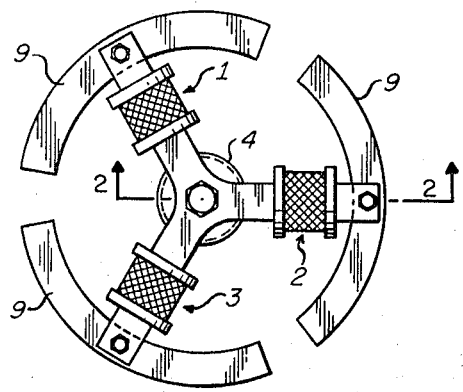
FIG. 1 schematically represents a preferred flux valve construction design for sensing the horizontal component of the earth's field.
Figure 2:
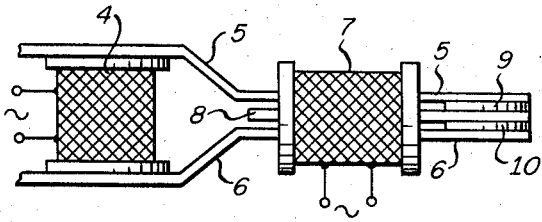
FIG. 2 is a slightly enlarged section, illustrating a preferred leg construction, taken in about the plane 2–2 of FIG. 1.

Referring first to FIGS. 1 and 2 which serve somewhat schematically to illustrate a preferred form of magnetometer or flux valve for use in compass systems, the three, 120° relatively angularly disposed, legs of the core structure are shown generally at 1, 2, and 3. A centrally disposed exciting core and coil 4 serve to generate the exciting magnetomotive force and, when energized with alternating current, causes an exciting flux to flow or circulate first in one and then the opposite direction through all of the core legs. As shown in FIG. 2 each core leg comprises upper and lower thin flat inductors of highly permeable magnetic material 5 and 6 which lie in closely spaced parallel relation in the zone thereof surrounded by the pickup coil 7. Throughout this zone a thin insulator strip 8 is preferably interposed between the inductors. Toward the center of the valve the inductors are separated to a greater extent in bifurcated fashion to accommodate the exciting core and coil 4. Arcuate collectors 9 and 10 are respectively affixed in contact with the upper and lower inductors of the legs to increase the density of the earth's field threading the leg inductors.

Figure 3:
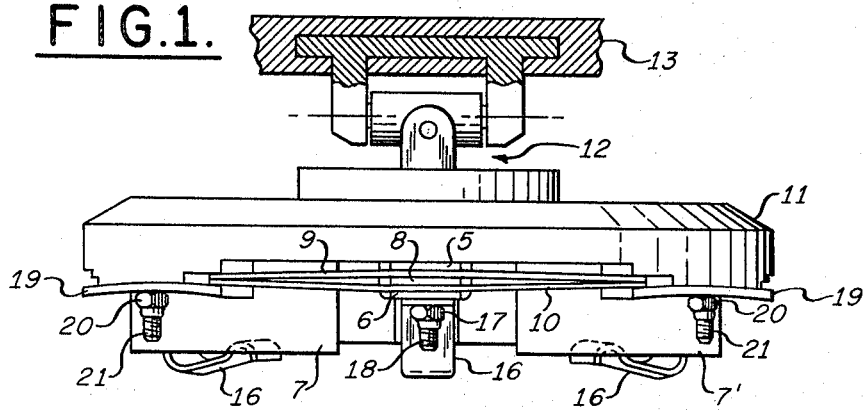
FIG. 3 is a fragmentary elevation view of a flux valve constructed in accordance with the present invention.

As illustrated in FIG. 3 the sensitive element of the flux valve comprising the core and coil structure is mounted within a recessed base member 11 which is supported by means of a universal joint indicated generally at 12 in a support 13. The support 13, in practice, is accurately positioned and fastened, for example, in a wing or vertical stabilizer of an aircraft, and the sensitive element of the flux valve within the base 11 is supported to hang in pendulous fashion so that the leg inductors may lie in generally horizontal planes. A dome-shaped enclosure, not shown, is normally affixed to the mount to encompass the sensitive element and ordinarily contains a damping fluid.

Figure 5:
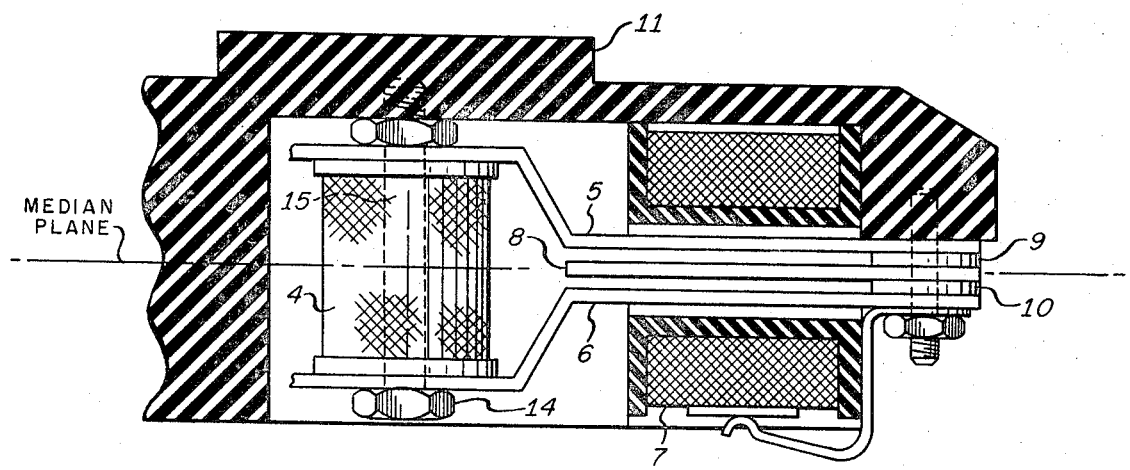
FIG. 5 is an enlarged fragmentary sectional view showing one manner in which the sensitive element is securely fastened to the base member.
Figure 6:
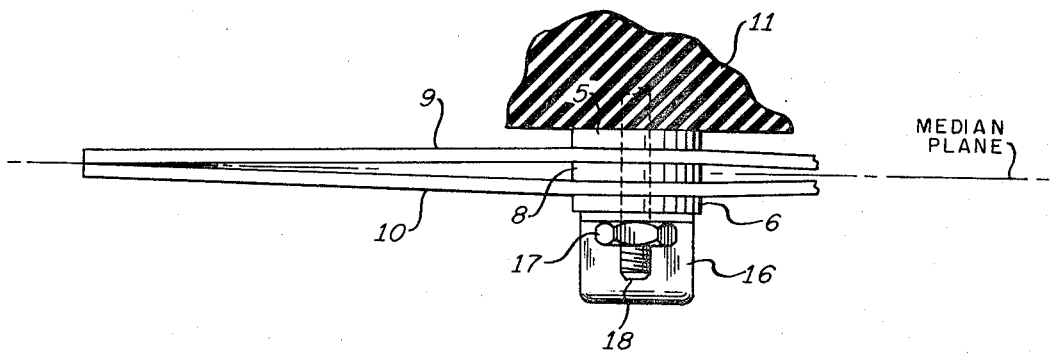
FIG. 6 is an enlarged fragmentary view showing details of the preferred arrangement of collectors.

It is to be noted that the sensitive element comprising the core and coil structure is designed to lie substantially symmetrically about the median plane as shown in FIGS. 5 and 6 and we can consider this plane as a normally horizontal plane. The base member, being pendulous, is designed to support the sensitive element in this fashion and in order to insure proper positioning of the core legs and collectors, the base is recessed or contoured to receive the sensitive element such that the latter is firmly and securely held against the surfaces of the base. Securing means such as the nut 14 on the central mounting stud 15, spring clamps 16 and nuts 17 on studs 18 embedded in the base, and clamping plates 19 and nuts 20 on studs 21 embedded in the base are carefully tightened up to provide the proper degree of restraint. By being positioned firmly against the base surface at the center and at intermediate points and peripheral zones of the sensitive element, the core members, collectors and the like are held in a generally horizontal position, symmetrical about the median plane so as to respond as fully as possible only to the horizontal component of the earth's field.

In accordance with this invention, in order that the initial accurate positioning of the sensitive element with respect to the base member does not change because of variations in ambient temperatures over wide ranges, the materials, of which the cores, the base, the central mounting stud 15 and the clamping plates 19 are formed, are so selected that besides having the desirable physical and electrical properties they have correlated thermal properties. For example, employing a magnetic core material such as Permalloy having a temperature coefficient of expansion of $7.1 \times 10^{16}$/° F., I prefer to employ a base material of Fiberglass filled diallyl phthalate $6.7 \times$ an expansion coefficient of $6.7 \times 10^{16}$/° F. K-Monel metal may be used for the center support stud and for the clamping rings which has an expansion coefficient of $7.8 \times 10^{16}$/° F.

Figure 4:
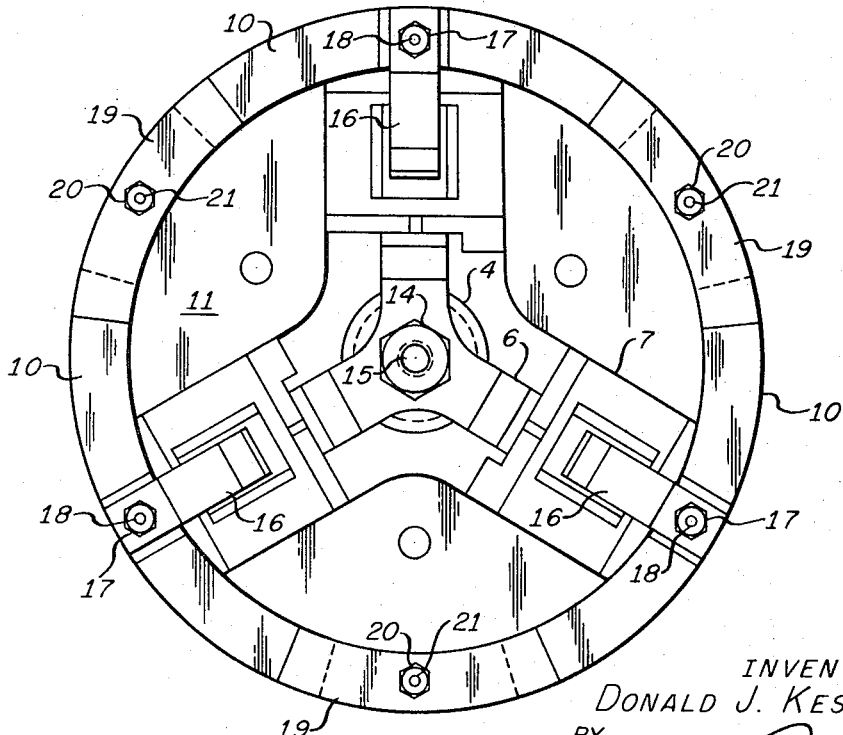
FIG. 4 is a bottom plan view of the flux valve element shown in FIG. 3.

As shown in FIG. 3, and more clearly in FIG. 6, the upper and lower arcuate collectors 9 and 10, constituting a pair, are spaced from each other in the zone where they lie in contact with the upper and lower leg inductors 5 and 6. Preferably the upper collector lies in contact with the underside of the upper leg inductor 5 and the lower collector lies in contact with the upper side of the lower leg inductor 6. The collectors extend laterally and from each side of the leg structure in arcuate fashion, the free ends of each pair of collectors being held together in flat, contacting relationship by clamping rings 19. In the embodiment shown, the clamping rings comprise three flat arcuate plates or strips of thin nonmagnetic material rather than a single ring to reduce eddy currents. If a single ring were to be used than it is preferably electrically insulated. Each ring overlies the adjacent ends of the pairs of collectors and in cooperation with the lower surface configuration of the base 11, shown as recess for this purpose, serves to clamp and hold the ends of the collectors together and in correct position substantially at the median plane. As more clearly shown in FIG. 4, the clamping action is obtained through the use of studs 21 embedded within the base 11 on which the clamping plates or rings are mounted and securely positioned by means of nuts 20.

Figure 7:
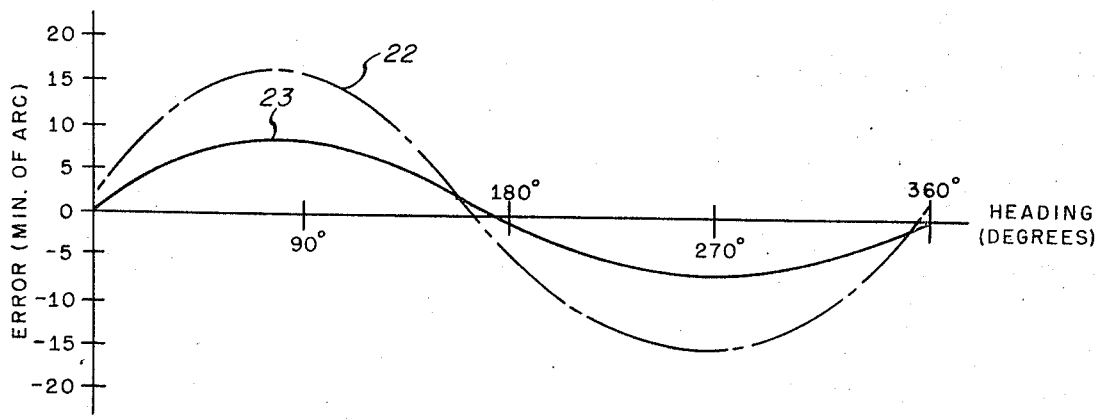
FIG. 7 displays error vs. heading curves illustrating comparative test results for different collector arrangements.

It will be observed by particular reference to FIG. 6 that the angle formed between the collectors 9 and 10 is exceedingly small with the collectors both disposed very close to a horizontal position and that the contacting zones of the two collectors afford passage of exciting flux from one to the other to the degree of saturation as is experienced in other parts of the magnetic circuit. Moreover, since the cross-sectional areas of the leg inductors and collectors are substantially equal and uniformly so, all portions of the magnetic circuit will accommodate and permit the passage of the exciting flux necessary and sufficient to drive out most of any permanent or residual magnetism which may arise and otherwise persist. In FIG. 7 comparative curves show the improvement in error content of the magnetometer output due to the above noted collector and leg inductor construction and correlation. In FIG. 7, the dot-dash line curve 22, based on test data, shows the error for headings throughout 360° of a flux valve using shorting tabs which extend vertically between parallely extending collectors but otherwise of the same construction as the flux valve of the present invention as herein illustrated and described. The errors are due to permanent or residual magnetization effects. Full line curve 23 is plotted in accordance with test data derived from a flux valve embodying the converging collectors and magnetic circuit of the present invention and it is evident that the improvement achieved represents a reduction in maximum error of one-half.

Figure 8:
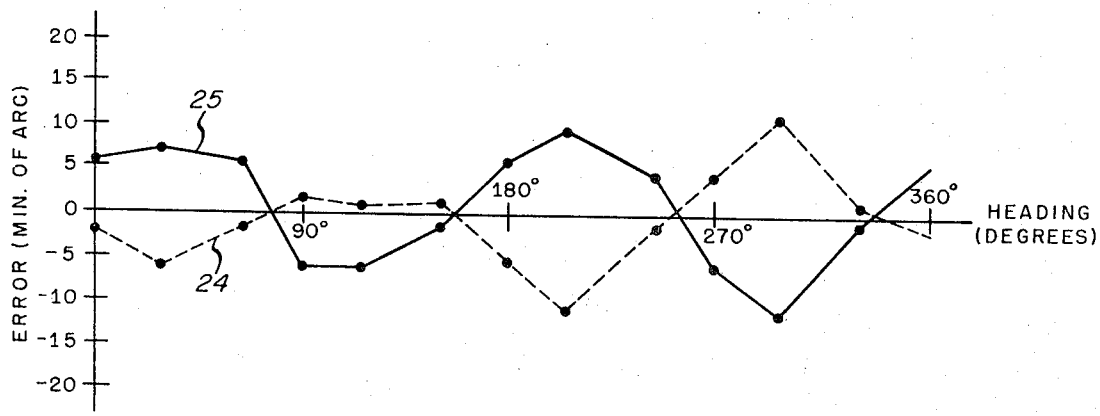
FIG. 8 displays error vs. heading curves illustrating comparative test results at both ends of a wide ambient temperature range.

The two curves of FIG. 8 illustrate the heading errors of the flux valve of the present invention at extreme ends of a range of temperatures under which it was tested. Note that the maximum heading errors detected at either −100° F. or +350° F. did not exceed ±12 min. of arc. This indicates excellent temperature stability over a wide range of temperatures such as those experienced under normal conditions of use. The dash line curve 24 represents errors in minutes of arc for various headings throughout 360° in azimuth or relative to a unidirectional field under an ambient temperature of −100° F. while the full line curve represents the same but under an ambient temperature of +350° F.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A magnetometer for sensing the horizontal component of the earth's magnetic field comprising a pair of thin flat core leg members of permeable magnetic material extending at least in part in generally parallel, spaced-apart relationship, exciting coil means magnetically coupled to said leg members for circulating an exciting magnetic flux in instantaneously opposite directions through said core leg members, pickup coil means surrounding said core leg members, and a pair of elongated flux collectors each formed of a thin flat core member of permeable magnetic material, each of said flux collectors being connected respectively at its midpoint with adjacent ends of said leg members and extending laterally from said ends of said leg members in generally overlying relationship, and said collectors being closely spaced apart at their connections to the leg members and arranged uniformly and gradually to converge toward each other and to contact each other at the ends thereof remote from said leg members.

2. A magnetometer for sensing the horizontal component of the earth's magnetic field comprising upper and lower, thin flat core leg members of permeable magnetic material having zones thereof extending in closely spaced, generally parallel relationship at and adjacent one end of said core leg members and spaced to an appreciably greater extent at the other end of said core leg members, an exciting core and coil structure disposed between said core leg members at the latter end and said exciting core extending normal to said core leg members, a pickup coil surrounding the closely spaced zones of the core leg members, upper and lower elongated arcuate flux collectors each formed of a thin flat core member of permeable magnetic material connected at their midpoints to and extending laterally from the closely spaced ends of said core leg members, the upper collector lying contiguous to and in contact with the lower surface of the upper core leg member and the lower collector lying contiguous to and in contact with the upper surface of the lower core leg member, said collectors being closely spaced apart at their connections to the leg members and arranged uniformly and gradually to converge toward each other and to contact each other at the ends thereof remote from said leg members.

3. The combination recited in claim 2 together with a nonmagnetic, electrically insulating base support for said core and coil structure, said base being contoured so that said core and coil structure may be secured firmly thereagainst and nonmagnetic fastening means for securing said core structure to the base at a plurality of spaced points, the magnetic core members and said base and fastening means being formed of different materials but said materials having values of temperature coefficients of expansion of substantially the same order of magnitude and correlated to minimize temperature variation effects on the performance of said magnetometer.

4. A magnetometer for sensing the horizontal components of the earth's magnetic field comprising a core and coil structure including three radially extending, equiangularly spaced core legs, each leg including an upper and lower, generally parallely extending core leg member of permeable magnetic material relatively closely spaced at the outer ends thereof and spaced to an appreciably greater extent as the inner ends thereof, an exciting core and coil structure disposed between and extending normal to said core leg members at the inner ends thereof for simultaneously passing an exciting flux through all three legs, pickup coils surrounding the more closely spaced zones of the core leg members respectively of each core leg, said pickup coils being connected together in multicircuit fashion, and upper and lower elongated arcuate flux collectors each formed of a thin flat core member of permeable magnetic material connected at their midpoints to and extending laterally from the outer end of each core leg member, said collectors being closely spaced apart at their connections to the leg members and arranged uniformly and gradually to converge toward each other and to contact each other at the ends thereof remote from said leg members.

5. The magnetometer recited in claim 4 in which the upper collector lies contiguous to and in contact with the lower surface of the upper core leg member and the lower collector lies contiguous to and in contact with the upper surface of the lower core leg member.

6. The combination recited in claim 4 together with a nonmagnetic, electrically insulating base support for said core and coil structure, said base being contoured so that said core and coil structure may be secured firmly thereagainst, and nonmagnetic fastening means for securing said core structure to the base at a plurality of spaced points, the magnetic core members and said base and fastening means being formed of different materials but said materials having temperature coefficients of expansion of substantially the same order of magnitude.

7. A magnetometer for sensing the horizontal components of the earth's magnetic field comprising a core and coil structure including three radially extending, equiangularly spaced core legs, each leg including an upper and lower, generally parallely extending core leg member of permeable magnetic material relatively closely spaced at the outer ends thereof and spaced to an appreciably greater extent at the inner ends thereof, an exciting core and coil structure disposed between and extending normal to said core leg members at the inner ends thereof for simultaneously passing an exciting flux through all three legs, pickup coils surrounding the more closely spaced zones of the core leg members respectively of each core leg, said pickup coils being connected together in multicircuit fashion, and upper and lower elongated arcuate flux collectors each formed of a thin flat core member of permeable magnetic material connected at their midpoints to and extending laterally from the outer end of each core leg member, the upper collector lying contiguous to and in contact with the lower surface of the upper core leg member and the lower collector lying contiguous to and in contact with the upper surface of the lower core leg member, said collectors being closely spaced apart at their connections to the leg members and arranged uniformly and gradually to converge toward each other and to contact each other at the ends thereof remote from said leg members, a nonmagnetic, electrically insulating base support for said core and coil structure, said base being contoured so that the central portion of the three-legged core may be secured in fixed position against the central portion of the base while the peripheral ends of the core legs and associated collectors may be also secured in fixed position against the base at its outer peripheral edge portions while maintaining the closely spaced zones of the radial leg members in substantially parallel planes normal to the axis of the centrally disposed exciting core and coil, a centrally disposed, nonmagnetic adjustable fastening means passing through the inner ends of the core leg members and exciting core and coil, means for securing the leg members to said base at the collector ends thereof, and means including nonmagnetic arcuate clamping members for firmly holding the free ends of the collectors in position and in mutually contacting relation, the magnetic core members and said base, adjustable fastening means and clamping members being formed of different materials but said materials having temperature coefficients of expansion of substantially the same order of magnitude whereby to maintain those core parts designed to lie horizontally in substantially horizontal positions throughout a wide range of ambient temperatures.